United States Patent Office 3,304,704
Patented Feb. 21, 1967

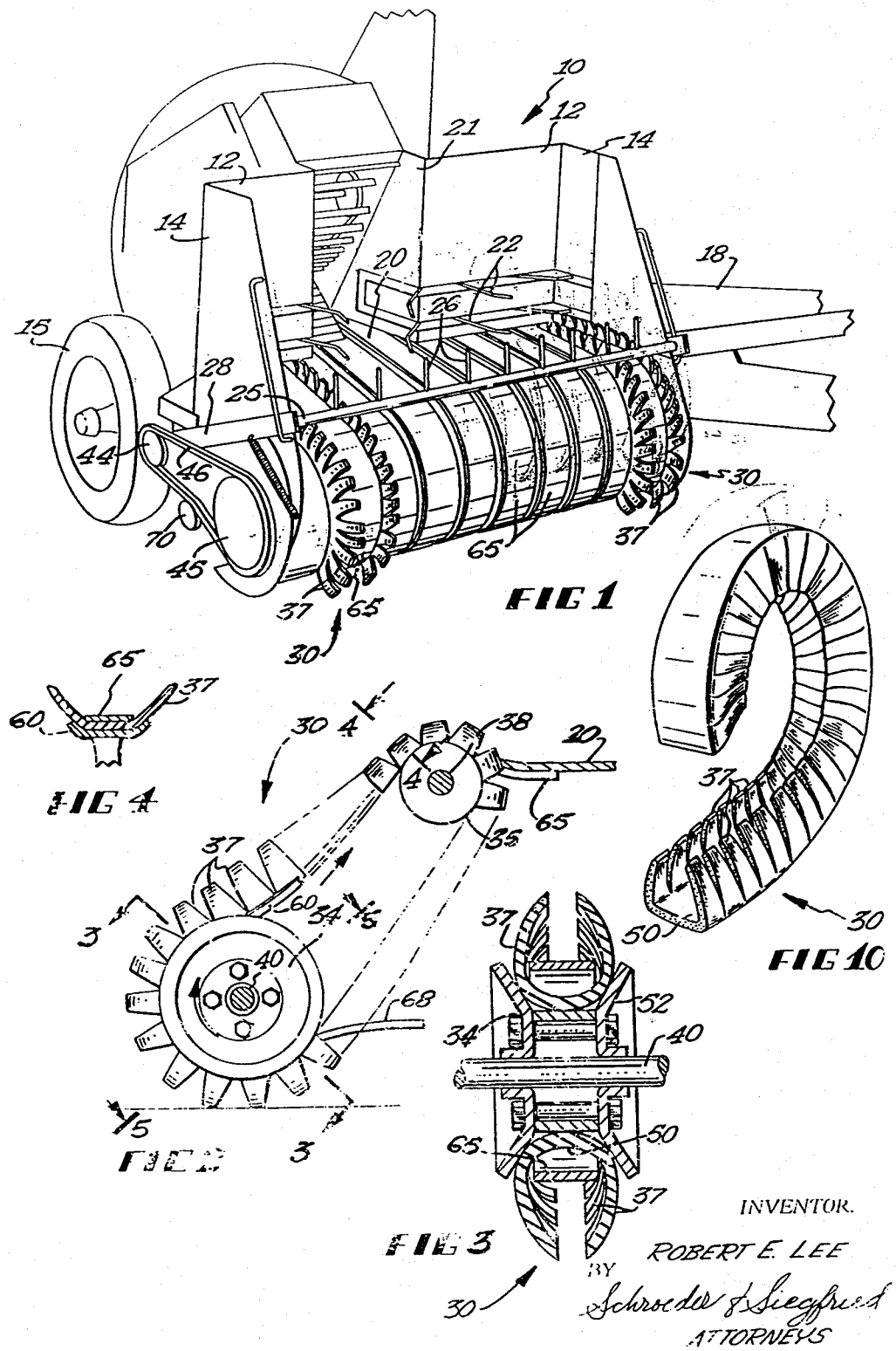

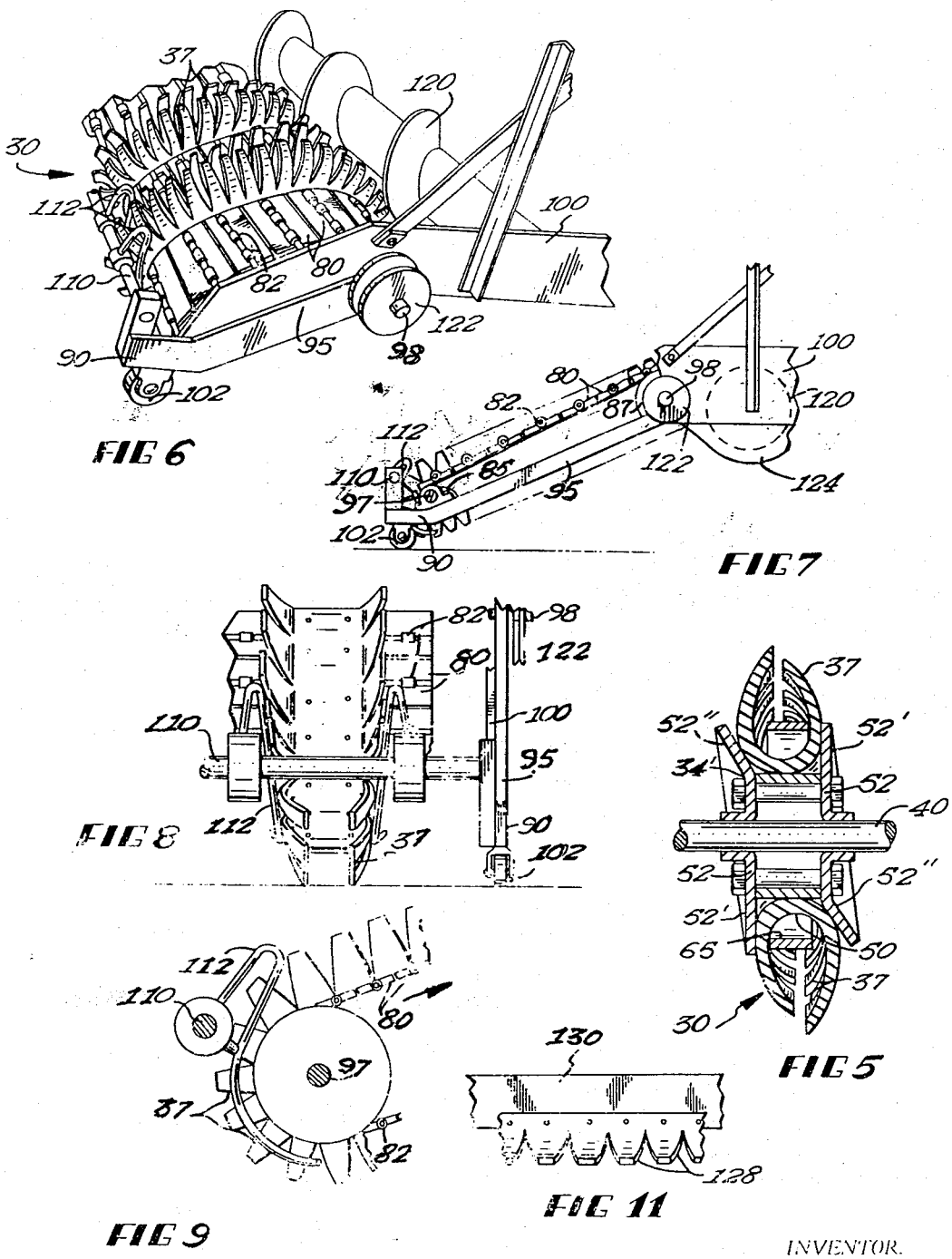

3,304,704
GRAIN PICKUP ATTACHMENT
Robert E. Lee, Larimore, N. Dak. 58251
Filed June 16, 1964, Ser. No. 375,533
14 Claims. (Cl. 56—364)

The present invention relates to agricultural apparatus and more particularly to an improved attachment device that is used primarily for picking up severed vegetation such as grain, hay and the like. The term "grain" is therefore used hereafter to indicate any vegetable matter which has been severed and which is capable of being picked up by apparatus of this class.

Devices and apparatus of this type are known and in use. Present day pickup apparatus used with harvesters and threshers as well as hay baling equipment generally include rigid or semi-rigid pickup fingers, prongs or spikes which are unable to pick up short grain. Further, these devices because of their relative inflexibility, are readily damaged by obstructions such as stones or hard objects encountered in the use of the same. This increases the maintenance problem in connection with an apparatus of this type, decreases the efficiency of the same and limits their application in short grain. This type of apparatus normally includes specially designed equipment which is not readily replaceable or repairable with equipment normally found on a farm, thereby leading to additional delay and expense in the repair and use of this apparatus.

The present invention is directed to an improved pickup apparatus which is particularly adapted for picking up short grain and includes a pickup belt with a plurality of flexible fingers which are adapted to be deflected in the pickup operation to increase the efficiency of the same. The pickup fingers, are relatively flexible and are not damaged by engagement of rocks or the like such that they have a normally long life as distinguished from comparable equipment. Further, this improved pickup attachment incorporates materials in the pickup belt and fingers which are readily constructed from existing equipment found around a farm such that they may be readily repaired at a minimum of expense and in a minimum of time decreasing the down time of the apparatus and increasing the efficiency of the same.

It is therefore an object of this invention to provide an improved grain pickup attachment.

Another object of this invention is to provide an improved grain pickup attachment particularly adapted for use in short grain.

A further object of this invention is to provide in an improved grain pickup attachment a flexible toothed or fingered arrangement and means for deflecting the same to enable the pickup fingers or teeth to pick up short grain A still further object of this invention is to provide an improved grain pickup attachment with flexible fingers to insure short grain pickup and reduce or eliminate tooth breakage and down time of the apparatus.

Another object of this invention is to provide an improved grain pickup attachment which can be readily manufactured or repaired through the use of tire carcasses which may be constructed into the pickup belt of the apparatus.

A further object of this invention is to provide an improved grain pickup attachment which is simple in design, economical to manufacture and requires a minimum of maintenance, yet can be made from materials such as tire carcasses normally found around a farm.

These and other objects of this invention will become apparent from a reading of the attached description together with the drawings wherein:

FIGURE 1 is a perspective view of an embodiment of the improved grain pickup attachment included with a conventional processing machine.

FIGURE 2 is a schematic side view of the pickup attachment shown in FIGURE 1.

FIGURE 3 is a sectional view of a portion of the pickup attachment taken along the lines 3—3 of FIGURE 2.

FIGURE 4 is a sectional view of the pickup belt taken along the lines 4—4 of FIGURE 2.

FIGURE 5 is a sectional view of a portion of the pickup attachment similar to FIGURE 3 and using an alternate cam construction.

FIGURE 6 is a perspective view of a portion of a conventional grain pickup device with another embodiment of the improved grain pickup attachment included therewith.

FIGURE 7 is a schematic side elevation view of the pickup attachment of FIGURE 6 showing the relationship of parts.

FIGURE 8 is a front view in section of the pickup attachment of FIGURE 7.

FIGURE 9 is a schematic view of the parts of the improved grain pickup attachment of FIGURES 6, 7, and 8.

FIGURE 10 is a perspective view of a tire carcass which is cut to form the pickup belt of the improved grain pickup attachment.

FIGURE 11 is a sectional view of a portion of a tire carcass of an alternate construction of the improved grain pickup attachment.

The improved grain pickup attachment as shown in FIGURE 1 is attached to a processing machine generally indicated at 10. This processing machine may be a harvester or baler and includes generally end walls 12 and side walls 14 with a suitable mounting frame including a wheeled support 15 and attaching arms 18 thereon. The side and end walls 12 and 14 define a table or platform 20 and a throat 21 of the processing machine with feeder arms or fingers 22 suitably driven through means, not shown, to move grain from the table 20 into the throat portion 21 of the processing machine. Also included in the processing machine is an adjustably mounted arm 25 having a plurality of retaining fingers 26 thereon which is adjustably positioned through a connecting link 28 to retain the grain picked up on the table 20 such that it may be advanced to the processing machine. Since the details of the processing machine form no part of the present invention, they are shown only schematically herein inasmuch as they depict conventional devices.

The pickup attachment includes a drive and support, as will be hereinafter identified, for a plurality of belt like members indicated generally at 30 adapted to pick up short cut grain from the ground and move it to the table 20 of the processing machine. The pickup members or belts 30 are each mounted on a pair of pulleys or support means, which pulleys may be mounted on an axle or drum in a spaced relationship. As will be seen in the side elevation view of FIGURE 2, a belt 30 is mounted on the pulley 34 and a pulley 35 with the belt extending between the pulleys and over the same with fingers 37 on the belt extending radially therefrom. Further, as will be seen in FIGURE 2, the pulleys are mounted on axles 38, 40 which axles are supported through suitable means (not shown) and terminate in drive pulleys 44, 45 at one extremity thereof with a driving belt 46 connected thereto designed to rotate the drive pulleys 44, 45 and hence the axles 38, 40 connected thereto rotate the pulleys 35, 34 mounted thereon. The individual pickup belts have a center section 50 with the radially extending fingers 37 which are formed on the sides thereof and are made of a pliable or flexible material with a normally pre-formed shape. Lower pulley 34 has a rib or cam surface 52 thereon designed to engage the sides of the fingers 37 and deflect the same toward one another. The upper pulley 35 is devoid of any significant side surfaces, such as indicated at 60, such that the fingers 37 will be moved outwardly or apart from one another to release grain in the pickup operation. Positioned between the fingers 37 on the pickup belt are guide supports 65, which guide supports extend substantially across the upper pulley with the belt thereon and terminate at the table 20, as indicated in FIGURE 2 and around a lower pulley and terminate, as at 68, to be adapted to be mounted to the support through suitable means (not shown). The guide strips form a table for the belt 30 to allow the grain to be picked up by the fingers 37 of the belt 30 to be moved from ground level to the table 20. The pulleys with the belts thereon are adapted to be driven such that the belts are moved upwardly toward the table 20, and the fingers thereon as they approach and engage the surface of the pulley 34 will be deflected inwardly at the ground level and at the forward end of the pickup attachment to grasp the short grain and lift the same along the guide strip 65 toward the table 20.

A plurality of guide strips 65 and belts 30 are mounted in a side by side relationship on the pulleys 36 supported by the axle 40 and driven by the pulley 45 of the grain pickup attachment. The belt 46 is driven through drive pulley 70 connected to a suitable motor means (not shown) which may be integral with the processing machine or independent thereof. Each of the pulleys 36 have similar cam means thereon to provide the deflection of the fingers 37 of the belt members 30 to aid in the pickup of the short grains. The flexible fingers 37 thereon are readily deformed by the engagement of rocks or other obstructions but are not sheared or broken, increasing the life of the pickup apparatus and reducing maintenance on the same. The movement of the fingers 37 from a clamped or closed position as the belt member is moved up the grain attachment over the pulley 35 without the cam or deflecting surfaces thereon will allow the fingers to expand and release the grain at the platform or table 20 of the processing machine where the grain is moved through the apparatus of the processing machine for the baling or harvesting operation.

FIGURE 5, which is similar to FIGURE 3, shows in section a version of the pulley or drum 34 with an alternate construction of the cam or camming surfaces thereon. In FIGURE 5, pulley 34' is constructed with a cam surface 52 having a dwell portion 52' and a rise portion 52" on one side of the pulley and similar rise and dwell portions 52', 52" on the other side of the pulley which are positioned opposite or 180° displaced from the rise and dwell portions on the first mentioned side of the pulley. The rise portions of the cam surfaces are constructed to have substantially no deflecting effect on the fingers 37, while the dwell portions 52' will cause the fingers on one side of the pickup belt to deflect toward the unaffected fingers on the other side of the pickup belt. Thus the fingers on the pickup belt will be alternately deflected from one side and then the other in a continuing sequence to give a raking action at the fingers for more effective short grain pickup as the belt is driven on the pulleys. While only a single dwell portion 52' is shown for each side of the pulley, it will be understood that several such dwell portions or camming surfaces may be positioned on each side of the pulley and alternately spaced from similar surfaces on the opposite side of the pulley. Further, such camming surfaces may be limited to one side of the pulley or drum, if desired.

FIGURE 6 of the pickup attachment shows the continuous flexible belt members with a plurality of fingers thereon applied to a conventional grain pickup shown partially in a perspective view. Thus, as will be seen in FIGURE 6, the plurality of belts 30 or belt members with the fingers 37 thereon attached to a rotating table or cover of the grain pickup attachment, which table or cover is formed by a plurality of slats 80 connected together through suitable pivoting type connecting means 82, the table cover or platform being directed across a pair of drums or pulleys indicated schematically at 85 and 87 in FIGURE 7 which is a schematic side view of the same with the supporting structure removed. It will be understood that a plurality of belts so attached are secured to the table or platform in a side by side relationship through suitable means (not shown) such that they will be rotated with the table or platform over the surface of the drums or pulleys 85, 87. The forward end of this grain attachment is connected to a wheeled support 90 which is turn is carried by a connecting bar 95 connecting the shafts 97, 98 which structure is supported through suitable side plates 100 adapted to be connected to the processing equipment or transfer equipment with which the grain pickup is associated. The wheeled support end 90 includes the wheels 102 at the front end of the same for supporting the grain pickup attachment as it moves forward of the processing machine along the ground such that the fingers 37 on the belt like members 30 are disposed adjacent the same for the purpose of picking up short grain on the ground. Mounted on the wheeled support 90 is a cross bar 110 carrying a plurality of cam rods 112 which are spaced to either side of the belt like members 30 and adapted to engage the fingers thereon to deflect the same at the forward end of the table 80. Thus as will be seen in FIGURES 6 and 7, the cam rods 112 are curved around the forward end of the table adjacent the wheeled support and carried by the supporting bar 110 which in turn is carried by the wheel frame 90. Shown schematically in FIGURE 6 is a transfer or feed auger 120 disposed adjacent the opposite end of the belt like members or the table 80 to move the grain picked up by the fingers on the belt like members on the ground or within the supporting structure and the harvesting machine in the manner desired. A drive pulley 122 is connected to the shaft 98 and is adapted to be suitably connected to and driven through means such as a motor (not shown). The motor may be independent of or included in the processing machine as desired.

As will be seen in this embodiment, the rod members or cam members 112 as they extend around the forward end of the pickup attachment engage the fingers 37 on the belt like members 30 to urge the same toward one another as the belt like members are moved with the table from the ground level in a clockwise direction, as seen in FIGURES 6 and 7, lifting the grain from the ground and moving it across the top of the table 80 to the rearward position of the table adjacent the auger 120 which will move the collected grain to a position for processing or further transfer. As seen in the side view of FIGURE 7, the auger is positioned adjacent the end of the table 80 with a suitable collecting support 124 underneath the same to insure that the grain released by the fingers 37 at this end of the table will be moved by the auger.

FIGURE 8 discloses a portion of the table 80 from the front, and it will be seen as the belt member 30 is rotated, the fingers 37 on the belt member will be deflected inwardly as they approach the ground from the bottom picking up the short grain and holding the same as the belt member with the deflected fingers move across to the top side of the table where the fingers are allowed to expand by virtue of the positioning of the cam rods 112 such that the grain therein will be moved up to and across the top of the table to the auger 120.

While I have shown cam rods on each side of the pickup belt engaging and deflecting the fingers thereon, it will be understood that a single rod on one side of each belt may be employed to give the raking action of the fingers similar to that described in connection with FIGURE 5.

FIGURE 10 shows schematically a tire carcass in perspective which tire carcass is severed, and a plurality of radial cuts are made in the same to define the fingers 37 of a pickup belt 30. The crown of the tire provides a center section 50 of the belt and the fingers are cut after the beading on the tire carcass is removed. In FIGURE 5, the tire carcass is in the reverse positions and will be turned inside out with its extremities connected to one another through suitable means (not shown) and positioned over the pulleys to provide the pickup belt. Although other materials and specially constructed belts may be used, the tire carcass may be readily fashioned to provide a pickup belt and this material is normally found around the farm so that it is readily available for maintenance and repair of the pickup attachment.

An alternate construction of the belt member 30 is shown in FIGURE 11 in which the belt members are formed of separate pieces 128 such as the half of a tire carcass with the fingers thereon and one or two such members may be mounted on one or both sides of a continuous belt 130 or drive to be operated or deflected in a manner previously described.

The use of the tire carcass permits an available and low cost supply of belt members which can be readily fashioned to provide the grain pickup parts which will not be susceptible to breakage and wear, and may be readily incorporated into existing grain pickup equipment to provide the improved grain pickup structure hereinbefore described. The use of the external cam rods 112 may be modified in shape to provide the deflecting action, and under certain circumstances when the supporting structure for the belt members are of sufficient circumference, the belt member will normally be moved to a partially deflected position merely by the radius of curvature of the support so that no separate deflecting or camming means may be required. Moving such a belt member across a sharp radius or small diameter pulley will tend to deflect the fingers apart for release of the grain pickup.

In considering this invention, it should be remembered that the present disclosure is intended to be illustrative only and the scope of the invention should be determined only by the appended claims.

I claim:

1. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, a pair of pulley means mounting said belt like member such that the belt member rotates on the pulley means, means drivingly connected to said pulley means for rotating said belt like member on said pulley means, cam means positioned on the side of one of said pulley means and adapted to engage the fingers thereof as said belt like member rotates on said pulley means to deflect the fingers toward one another at said one of said pulley means.

2. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, and being connected at its extremities to form a continuous member, a pair of pulley means mounting said belt like member such that the belt member rotates on the pulley means, means drivingly connected to said pulley means for rotating said belt like member on said pulley means, cam means positioned on the side of one of said pulley means and adapted to engage the fingers thereof as said belt like member rotates at one of said pulley means to deflect the fingers toward one another.

3. In a device of the class described in combination, a belt like member having a center section with a plurality of fingers extending from opposite sides of the center section, each of said fingers being formed to have a predetermined curved shape and such that the fingers on opposite sides of said center section are curved toward one another, said belt like member with said fingers integral therewith being formed of a flexible material, a pair of pulley means mounting said belt like member such that the belt like member rotates on the pulley means, means drivingly connected to said pulley means for rotating said belt like member on said pulley means, cam means positioned on one side of one of said pulley means and adapted to engage the fingers thereof as said belt like member rotates on said pulley means to deflect the fingers on one side of said belt like member toward the fingers on the other side of said belt like member.

4. In a device of the class described in combination, a belt like member having a center section with a plurality of fingers extending from opposite sides of the center section, each of said fingers being formed curved along their extent, said belt like member with said fingers integral therewith being formed of a flexible material and being connected in its extremities to form a continuous member, a pair of pulley means mounting said belt like member such that the belt member rotates on the pulley means, means drivingly connected to said pulley means for rotating said belt like member on said pulley means, cam means positioned on the side of one of said pulley means and adapted to engage the fingers thereof as said belt like member rotates on said pulley means to deflect the fingers toward one another.

5. The device of the class described in claim 1 in which the belt like member is a conventional tire casing which has been cut radially through the side walls of the tire casing to form the plurality of fingers and positioned with the fingers extending outwardly to form the continuous belt like member.

6. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member and said fingers being formed of a flexible material, a pair of pulley means mounting said belt like member such that the belt member rotates on the pulley means, means drivingly connected to said pulley means for rotating said belt like member on said pulley means, cam means positioned adjacent to one of said pulley means and adapted to engage the fingers thereof as said belt like member rotates on said one of said pulley means to deflect the fingers toward one another.

7. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, support means mounting said belt like member such that the belt member rotates on the support means, means drivingly connected to said support means for rotating said belt like member on said support means, cam means positioned on the side of one end of said support means and adapted to engage the fingers thereof as said belt like member rotates on said support means to deflect the fingers toward one another at said one end of said support means.

8. In a device of the class decribed in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, support means mounting said belt like member such that the belt member rotates on the support means, means drivingly connected to said support means for rotating said belt like member on said support means, cam means associated with one end of said support means and adapted to engage the fingers thereof as said belt like member rotates on said support means to deflect the fingers toward one another at said one end of said support means.

9. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, support means mounting said belt like member such that the belt member rotates on the support means, means drivingly connected to said support means for rotating said belt like member on said support means, cam means included as a part of one end of said support means and adapted to engage the fingers thereof as said belt like member rotates on said support means to deflect the fingers toward one another at said one end of said support means.

10. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, rotatable support means mounting said belt like member such that the belt member rotates on the support means, means drivingly connected to said support means for rotating said belt like member on said support means, cam means positioned adjacent one end of said support means and adapted to engage the fingers of the belt like member as said belt like member rotates on said one end of said support means to deflect the fingers toward one another.

11. In a device of the class described in combination, a belt like member having a center section with a plurality of fingers extending from opposite sides of the center section, each of said fingers being formed to have a predetermined curved shape and such that the fingers on opposite sides of said center section are curved toward one another, said belt like member with the fingers integral therewith being formed of a flexible material, a pair of pulley means mounting said belt like member such that the belt like member rotates on the pulley means, means drivingly connected to said pulley means for rotating said belt like member on said pulley means, cam means positioned on a portion of one side of one of said pulley means and adapted to sequentially engage the fingers thereof as the belt like member rotates on said pulley means to sequentially deflect the fingers on one side of said belt like member toward the fingers on the other side of said belt like member.

12. In a device of the class described in combination, a belt like member having a center section with a plurality of fingers extending from opposite sides of the center section, each of said fingers being formed to have a predetermined shape such that the fingers on opposite sides of said center section are directed generally in opposite directions, said belt like member with said fingers integral therewith being formed of a flexible material, a pair of pulley means mounting said belt like member such that the belt member rotates on the pulley means, means drivingly connected to said pulley means for rotating said belt like member on said pulley means, cam means positioned on alternate portions of the sides of one of said pulley means and adapted to sequentially engage the fingers of said belt like member on alternate sides thereof as said belt like member rotates on said pulley means to sequentially deflect the fingers on alternate sides of said belt like member toward one another at said one of said pulley means.

13. The device of the class described in combination, a pair of belt like members each having a continuous section with a plurality of fingers extending from one side thereof, each of said fingers being formed to have a predetermined shape and being curved relative to the continuous section, said belt like member with said fingers integral therewith being formed of a flexible material, a continuous support member mounting said belt like members and connected thereto with the belt like members being located on opposite sides thereof and with the fingers thereon being directed generally toward one another, a pair of pulley means mounting said belt like members such that the belt member rotates on the pulley means, means drivingly connected to said pulley means for rotating said belt like member on said pulley means, cam means positioned on the side of one of said pulley means and adapted to engage the fingers thereof as said belt like member rotates on said one of said pulley means to deflect the fingers toward one another.

14. The device of the class described of claim 13 in which the belt like members and the continuous support member are formed from a conventional tire carcass with a plurality of radial cuts through the side walls of the same to form the fingers and with the fingers extending outwardly from the tire carcass.

References Cited by the Examiner

UNITED STATES PATENTS 2,796,722   6/1957   Hanford et al. _____ 56—364
3,120,892   2/1964   Hennington et al. ___ 198—179

ABRAHAM G. STONE, *Primary Examiner.*

ANTONIO F. GUIDA, *Examiner.*